United States Patent
Yamamoto et al.

[11] Patent Number: 5,826,376
[45] Date of Patent: Oct. 27, 1998

[54] WINDOW REGULATOR FOR A VEHICLE AND METHOD OF ASSEMBLING THE SAME

[75] Inventors: Hiroyuki Yamamoto, Toyota; Koichi Fujimoto, Kariya; Yukio Isomura, Anjo, all of Japan

[73] Assignee: Aisin Seiki Kabushiki Kaisha, Kariya, Japan

[21] Appl. No.: 734,854

[22] Filed: Oct. 23, 1996

[30] Foreign Application Priority Data

Oct. 24, 1995 [JP] Japan .................................. 7-275574

[51] Int. Cl.$^6$ ........................................................ E05F 1/00
[52] U.S. Cl. .............................. 49/350; 49/506; 411/506
[58] Field of Search ............................. 49/348, 349, 350, 49/351, 506; 411/501, 504, 505, 506; 403/279, 280, 282

[56] References Cited

U.S. PATENT DOCUMENTS

| | | | |
|---|---|---|---|
| 2,780,458 | 2/1957 | Thaxton | 49/351 X |
| 3,419,297 | 12/1968 | Diepenhorst et al. | 411/501 X |
| 3,936,205 | 2/1976 | Speakman | 403/279 |
| 3,958,389 | 5/1976 | Whiteside et al. | 411/504 X |
| 4,681,499 | 7/1987 | Sparling et al. | 411/506 X |
| 4,723,456 | 2/1988 | Köhler et al. | 49/351 X |
| 4,822,671 | 4/1989 | Carper et al. | 411/501 X |
| 4,986,029 | 1/1991 | Richter | 49/351 X |
| 5,085,004 | 2/1992 | Beauprez | 49/350 X |

FOREIGN PATENT DOCUMENTS

| | | |
|---|---|---|
| 24 33 668 | 1/1976 | Germany . |
| 77 23 739 | 7/1977 | Germany . |
| 5-295947 | 11/1993 | Japan . |

*Primary Examiner*—Jerry Redman
*Attorney, Agent, or Firm*—Oblon, Spivak, McClelland, Maier & Neustadt, P.C.

[57] ABSTRACT

A window regulator for a vehicle has a lift arm pivotally mounted on a door panel of a vehicle. A gear plate including teeth on the periphery thereof is connected to one end of the lift arm. A driving device engages with the teeth and moves the gear plate. A movable rail is connected to a window glass, the movable rail engaging with the other end of the lift arm. Holes are disposed in one end of the lift arm and convex portions are disposed in said gear plate, the convex portions being inserted into said holes and pressed into a flat shape.

2 Claims, 3 Drawing Sheets

5,826,376

WINDOW REGULATOR FOR A VEHICLE AND METHOD OF ASSEMBLING THE SAME

BACKGROUND OF THE INVENTION

1. Field of the Invention

This invention relates to a window regulator for a vehicle and a method of assembling the same.

2. Description of the Related Art

A conventional window regulator for a vehicle is disclosed in Japanese Patent application Laid-open publication No. Hei 5-295947. This window regulator comprises a lift arm pivotally supported by a base fixed on a door panel. A gear plate with a gear on the periphery thereof is fixed to one end of the lift arm. A driving element is fixed on the base which engages with the gear of the gear plate and moves the gear plate, and a movable rail movably engages with the other end of the lift arm.

The lift arm and gear plate of the window regulator are connected to each other by a projection weld. The use of a projection weld makes it necessary to provide a certain distance between the welded portion and the gear in order to prevent the gear plate from warping and bending due to the welding heat.

However, providing a distance between the gear of the gear plate and the welded portion leads to enlargement of the gear plate and the window regulator. This limits the space within a door of a vehicle in which the window regulator can be disposed.

The burring method is also available to connect two plate members. With this method, convex portions are made in a plate by deeply squeezing the plate and each convex portion is inserted through holes in the other plate. Then both plates are fixed together by pressing the convex portions into a flat shape. Because this method involves a deep squeezing of a plate, it is difficult to apply to a thick plate like a gear plate of a window regulator.

SUMMARY OF THE INVENTION

It is therefore an object of the present invention to provide a window regulator which addresses at least the forgoing drawbacks of the prior art.

It is a further object of the invention to provide a method of assembling the window regulator.

According to a feature of the present invention, a window regulator for a vehicle comprises a lift arm pivotally mounted on a door panel of a vehicle; a gear plate including teeth on the periphery thereof and connected to one end of said lift arm; a driving means engaging with said teeth for moving said gear plate; and a movable rail to which a window glass may be fixed, said movable rail engaging with the other end of said lift arm, wherein convex portions are disposed on one of said gear plate and the one end of the lift arm, and holes are formed in the other of said gear plate and the one end of the lift arm, and wherein the convex portions extend through said holes and have flattened ends so as to connect said gear plate and said lift arm.

According to another feature of the invention, a method of assembling a window regulator for a vehicle, the window regulator including a lift arm pivotally mounted on a door panel of a vehicle, a gear plate including teeth on the periphery thereof and connected to one end of said lift arm, driving means engaging with said teeth for moving said gear plate and said lift arm, and a movable rail to which a window glass may be fixed, said movable rail engaging with the other end of said lift arm, comprises the steps of extending convex portions on one of said gear plate and the one end of the lift arm through holes formed in the other of said gear plate and the one end of the lift arm, and flattening ends of said convex portions extended through the holes so as to connect said gear plate and said lift arm.

According to the present invention, since the gear plate is fixed to a lift arm by inserting the convex portions of the gear plate through the holes in the lift arm and pressing the convex portions into a flat shape instead of welding them, the gear plate can be downsized without affecting the precision of the gear shape.

BRIEF DESCRIPTION OF THE DRAWINGS

The foregoing and additional features of the present invention will become apparent from the following detailed description of the preferred embodiment thereof when considered with reference to the attached drawings, in which.

DETAILED DESCRIPTION OF THE PREFERRED EMBODIMENT

Figure 1:
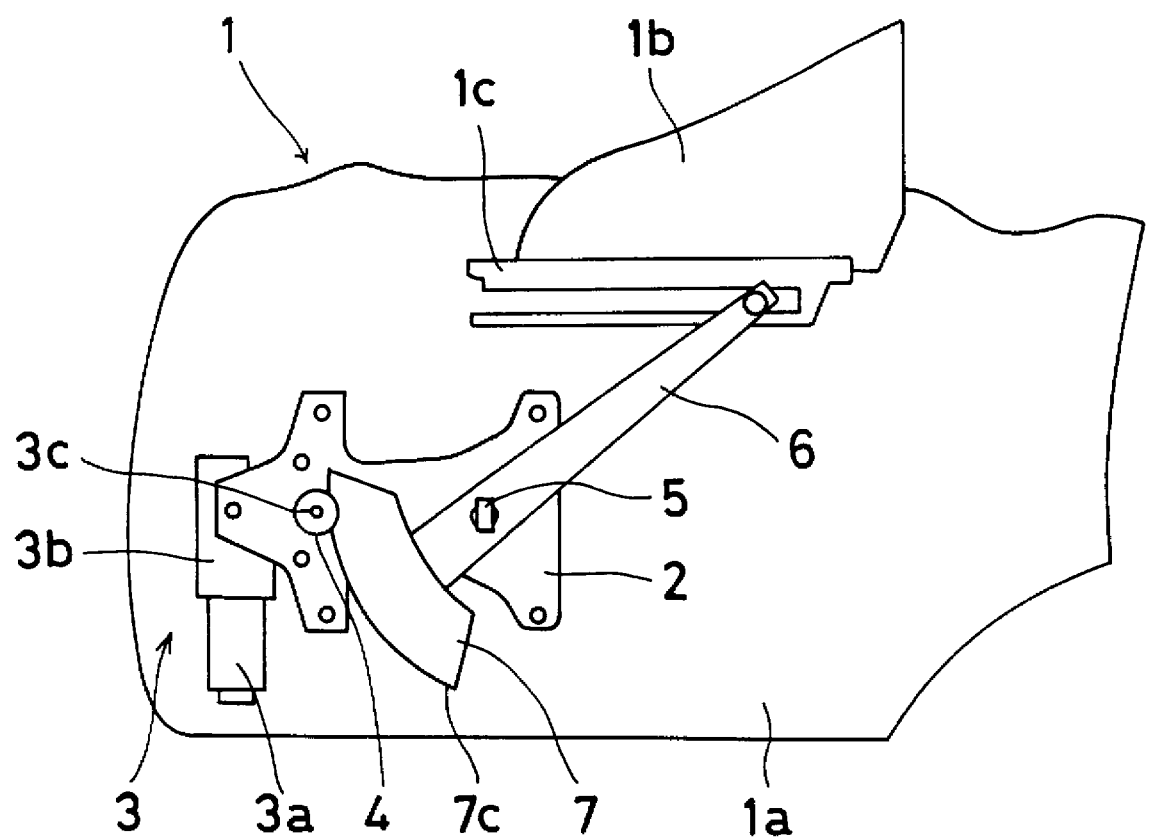
FIG. 1 is a front view of a window regulator according to the present invention applied to a door of a vehicle.

As FIG. 1 shows, a base member 2 is fixed to a door of a vehicle and a driving means 3 including a motor 3a and a reduction gearbox 3b is fixed to the base member. A pinion 4 is fixed to an output shaft 3c of the driving means 3. A lift arm 6 is pivotally supported by the base member 2 by way of an axle 5. A sector gear 7 whose teeth 7c engage with the pinion 4 is fixed to one end of the lift arm 6. A window glass which is disposed in the door panel 1a is mounted to a movable rail 1c. The movable rail 1c has a slot in which the end of the lift arm 6 can slide as the lift arm pivots on the axle 5.

When the driving means 3 is actuated and the pinion 4 rotates, the rotation of the pinion 4 is transmitted to the sector gear 7 and the lift arm 6 pivots on the axle 5 with the other end thereof sliding along the slot of the movable rail 1c. With this action, the window glass 1b mounted to the lift arm 6 moves up and down.

Figure 2:
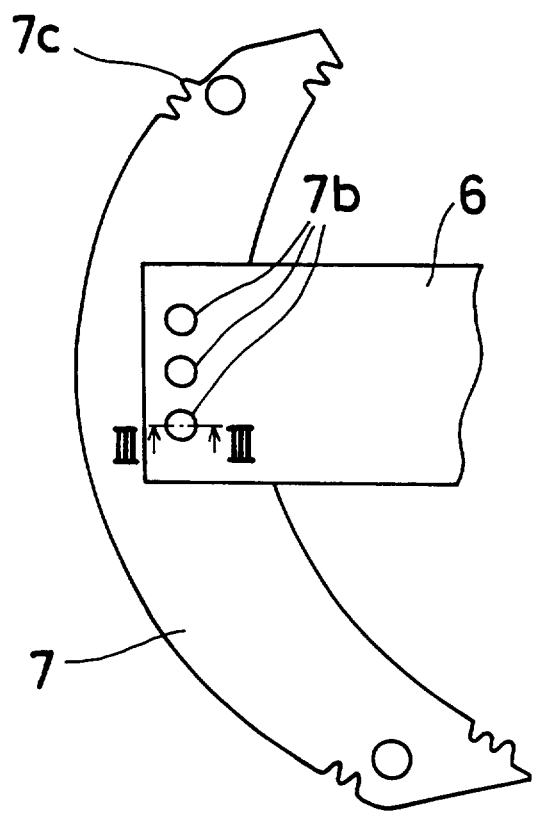
FIG. 2 is an enlarged view of the window regulator according to FIG. 1.
Figure 3:
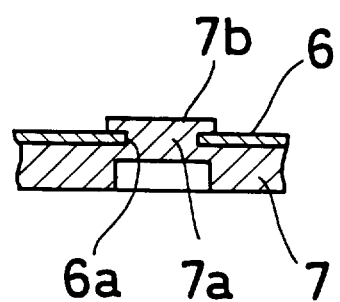
FIG. 3 is a cross section taken on line III—III of FIG. 2.

The following explains the connecting portion between the lift arm 6 and the sector gear 7 with reference to FIGS. 2 and 3.

As FIGS. 2 and 3 show, the sector gear 7 with the teeth 7a on the periphery thereof has three convex portions 7a. The sector gear 7 is fixed to the lift arm 6 by inserting the convex portions 7a of the sector gear 7 through the holes 6a of the lift arm 6 and pressing the convex portions 7a into a flat portion 7b.

Figure 4:
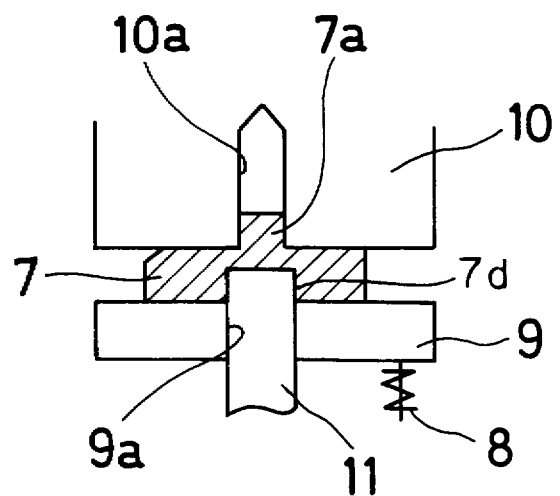
FIG. 4 shows how to make a convex portion on a sector gear of a window regulator according to the present invention.
Figure 5:
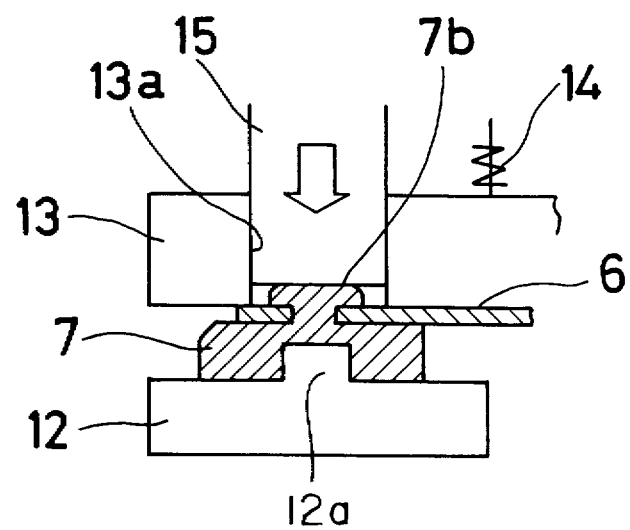
FIG. 5 shows how to press the convex portion of the sector gear of a window regulator according to the present invention.

FIGS. 4 and 5 show how to form the connecting portions between the lift arm 6 and the sector gear 7.

As FIG. 4 shows, the sector gear 7 is put on a base 9 with a punch hole 9a supported by a spring 8. A die 10 with a squeeze hole 10a is put on the sector gear 7. When a punch 11 having a diameter greater than that of the squeeze hole 10a and extending through the punch hole 9a is pressed against the sector gear 7, a convex portion 7a and a larger diameter concave portion 7d aligned therewith are formed.

As FIG. 5 shows, the sector gear 7 with the convex portion 7a is put on a lower die 12. A large diameter convex portion 12b of the lower die fits in the concave portion 7d of the sector gear 7 to support the sector gear against the force of the punch 15. The lift arm 6 is put on the sector gear 7 so that the convex portion 7a of the sector gear 7 extends through the hole 6a of the lift arm 6. An upper die with a punch hole 13a which is connected to a spring 14 is put on the lift arm 6. When the punch 15 extended through the punch hole 13a is pressed against the convex portion 7a, the convex portion 7a is turned into the flat portion 7b and the lift arm 6 is firmly fixed to the sector gear 7.

What is claimed as new and is desired to be secured by Letters Patent of the United States is:

1. A window regulator in a vehicle comprising:
   a lift arm pivotally mounted on a door panel of a vehicle;
   a gear plate including teeth on a periphery thereof and connected to one end of said lift arm;
   driving means engaging with said teeth for moving said gear plate and said lift arm; and
   a movable rail to which a window glass may be fixed, said movable rail engaging with an other end of said lift arm,
   wherein aligned pairs of recesses and projections are formed by deformation of said gear plate, said recesses having a diameter greater than that of said projections, wherein holes are formed in the lift arm, and wherein the projections extend through said holes and have flattened ends so as to connect said gear plate and said lift arm.

2. A method of assembling a window regulator in a vehicle, the window regulator including a lift arm pivotally mounted on a door panel of a vehicle, a gear plate including teeth on a periphery thereof and connected to one end of said lift arm, driving means engaging with said teeth for moving said gear plate and said lift arm, and a movable rail to which a window glass may be fixed, said movable rail engaging with an other end of said lift arm, said method comprising the steps of:

using a punch and a die having a die hole with a diameter smaller than the diameter of the punch to form an aligned pair of a recess and a projection by deformation of said gear plate, said recess having a diameter greater than that of said projection;

mounting said gear plate on a lower die having a convex portion having a diameter greater than that of said projection of said gear plate, such that the convex portion of said lower die is housed in the recess of said gear plate;

extending said projection of said gear plate through a hole formed in the lift arm; and flattening the end of said projection of said gear plate extended through the hole, while backing up the gear plate with the convex portion of the lower die, so as to connect said gear plate and said lift arm.

* * * * *